(12) United States Patent
Bentley et al.

(10) Patent No.: US 7,805,128 B2
(45) Date of Patent: Sep. 28, 2010

(54) AUTHENTICATION BASED ON FUTURE GEO-LOCATION

(75) Inventors: Jon Louis Bentley, New Providence, NJ (US); George William Erhart, Loveland, CO (US); Lawrence O'Gorman, Madison, NJ (US); Michael J. Sammon, Watchung, NJ (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 938 days.

(21) Appl. No.: 11/561,830

(22) Filed: Nov. 20, 2006

(65) Prior Publication Data

US 2008/0120718 A1    May 22, 2008

(51) Int. Cl.
 *H04M 1/66* (2006.01)
 *H04W 24/00* (2009.01)
 *H04W 4/02* (2009.01)
(52) U.S. Cl. ............... 455/411; 455/456.1; 455/456.3; 455/456.6; 455/414.1; 726/21
(58) Field of Classification Search ........... 455/410, 455/411, 456.1–456.6, 414.1–414.4; 726/21
See application file for complete search history.

(56) References Cited

U.S. PATENT DOCUMENTS

| | | | |
|---|---|---|---|
| 6,484,033 B2 * | 11/2002 | Murray | 455/456.3 |
| 6,895,238 B2 * | 5/2005 | Newell et al. | 455/414.2 |
| 7,082,297 B2 | 7/2006 | Tuomi et al. | |
| 7,123,604 B2 | 10/2006 | Inoue et al. | |
| 7,136,646 B1 | 11/2006 | Back et al. | |
| 7,308,703 B2 * | 12/2007 | Wright et al. | 726/1 |
| 2006/0173776 A1 | 8/2006 | Shalley et al. | |
| 2006/0194592 A1 * | 8/2006 | Clough | 455/456.3 |

* cited by examiner

*Primary Examiner*—Lester Kincaid
*Assistant Examiner*—Matthew Sams
(74) *Attorney, Agent, or Firm*—DeMont & Breyer, LLC

(57) ABSTRACT

An apparatus and methods are disclosed for authenticating users of wireless telecommunications terminals. A user is authenticated by instructing the user to travel to a geo-location, where the geo-location is referred to by an identifier that the user has previously associated with the geo-location. When the user chooses identifiers that are meaningful to the user, but that do not indicate the associated geo-locations to other people, the user can be securely authenticated via the following procedure: (i) select one of the identifiers that the user has defined, (ii) instruct the user to "go to <identifier>," and (iii) declare the user authenticated if and only if the user visits the geo-location associated with <identifier> before a timeout expires.

19 Claims, 6 Drawing Sheets

AUTHENTICATION BASED ON FUTURE GEO-LOCATION

FIELD OF THE INVENTION

The present invention relates to computer security in general, and, more particularly, to authentication for wireless telecommunications terminals.

BACKGROUND OF THE INVENTION

Wireless telecommunications terminals (e.g., cell phones, personal digital assistants [PDAs] with wireless capabilities, notebook computers with wireless capabilities, etc.) are increasingly being used in the workplace for job-related tasks. Some enterprises have deployed software applications that execute on a server and can be accessed by workers via their wireless terminals. Such applications are commonly referred to as wireless web-based applications or wireless client/server applications, depending on whether or not a browser is used as the user interface on the wireless terminals.

In some domains, such as health care, it is especially convenient for workers to use hands-free wireless terminals so that using the wireless terminal does not interfere with their other job duties. When a hands-free wireless terminal is used to access a wireless client/server application, typically the user issues voice commands in lieu of keypad inputs and receives audio responses in lieu of a video display.

FIG. 1 depicts illustrative telecommunications system 100 in the prior art. As shown in FIG. 1, telecommunications system 100 comprises telecommunications network 105, hands-free wireless terminal 110, and server 120, interconnected as shown.

Telecommunications network 105 is a network that comprises one or more wireless elements (e.g., wireless access points, wireless base stations, etc.) and is capable of transporting signals between server 120 and other devices, such as hands-free wireless terminal 110.

Hands-free wireless terminal 110 is a device that is typically worn on a user's person (e.g., clipped to one of the user's ears, etc.) and is capable of wirelessly transmitting and receiving electromagnetic signals to and from telecommunications network 105 via a wireless transceiver; of receiving voice inputs and converting them to electromagnetic signals via a microphone; and of converting electromagnetic signals to acoustic signals and outputting the acoustic signals to the user via a speaker.

Server 120 is a data-processing system that is capable of executing one or more software applications and of receiving and transmitting signals via telecommunications network 105.

In some instances it is desirable for security reasons to require that users are authenticated before being allowed to access an application or other resource on a server. Typically a user is presented with an authentication challenge, and the user must supply a valid response to the challenge. A classic challenge/response mechanism, colloquially referred to as "logging in," is to prompt a user to respond with his or her username and password. This mechanism is not well-suited for hands-free wireless terminals, however, because it requires that a user say his username and password aloud, and it is often difficult for the user to ensure that no one else overhears this information.

Other authentication techniques of the prior art are also poorly suited to hands-free wireless terminals. In one such technique, a user uses an electronic token device or a list of numbers to respond to an authentication challenge with a one-time password response. While this eliminates the problem of the password being overheard, it requires the user to carry around and consult the token device or list, thereby largely negating the advantage of having a hands-free terminal. In another technique, speaker recognition, a user is authenticated by comparing his or her speech to a database of known speakers. The disadvantages of speaker recognition are two-fold: first, it suffers from high error rates—particularly in the noisy environments that typically predominate in workplaces—and second, it is possible for another person to record a user's voice and play back the recording to impersonate the user.

Therefore, what is needed is a secure authentication technique for hands-free wireless terminals that overcomes some of the disadvantages of the prior art.

SUMMARY OF THE INVENTION

The present invention is a secure method of authenticating users of hands-free wireless terminals, without some of the disadvantages of the prior art. In particular, a user is authenticated by instructing the user to travel to a geo-location, where the geo-location is referred to by an identifier that the user has previously associated with the geo-location. When the user chooses identifiers that are meaningful to the user, but that do not indicate the associated geo-locations to other people the user can be securely authenticated via the following procedure:

(i) select one of the identifiers that the user has defined,
(ii) instruct the user to "go to <identifier>," and
(iii) declare the user authenticated if and only if the user visits the geo-location associated with <identifier>, before a timeout expires.

For example, a user might assign the identifier "favorite hangout" to the geo-location of Starbucks store number 28,453. When challenged with the instruction "go to favorite hangout," the user knows exactly where to go, but presumably another person will not. Even if an observer is aware of the authentication procedure and sees the user going to Starbucks store number 28,453, this does not give the observer the information necessary to impersonate the user because the identifier "favorite hangout" is heard only by the user, so that the user has no knowledge that Starbucks store number 28,453 is associated with the name "favorite hangout." Furthermore, if the user has defined a sufficiently large number of identifier/geo-location pairs, then it becomes very unlikely that an observer who gains possession of the user's terminal would be challenged with the same identifier "favorite hangout."

In a variation of the illustrative embodiment of the present invention, a user is challenged with an instruction to do something at a particular geo-location. For example, the user might be instructed to "say the word 'hello' at favorite hangout." Such commands can further obfuscate the authentication process and thwart a malicious observer who is spying on the user.

The illustrative embodiment comprises: transmitting an identifier I to a wireless telecommunications terminal at time t, wherein the user of the wireless telecommunications terminal has associated the identifier I with a geo-location L; and when the geo-location of the wireless telecommunications terminal is substantially the same as L at a time that exceeds t by no more than a positive threshold, storing in a memory a value that indicates that the user is authenticated.

DETAILED DESCRIPTION

Figure 1:
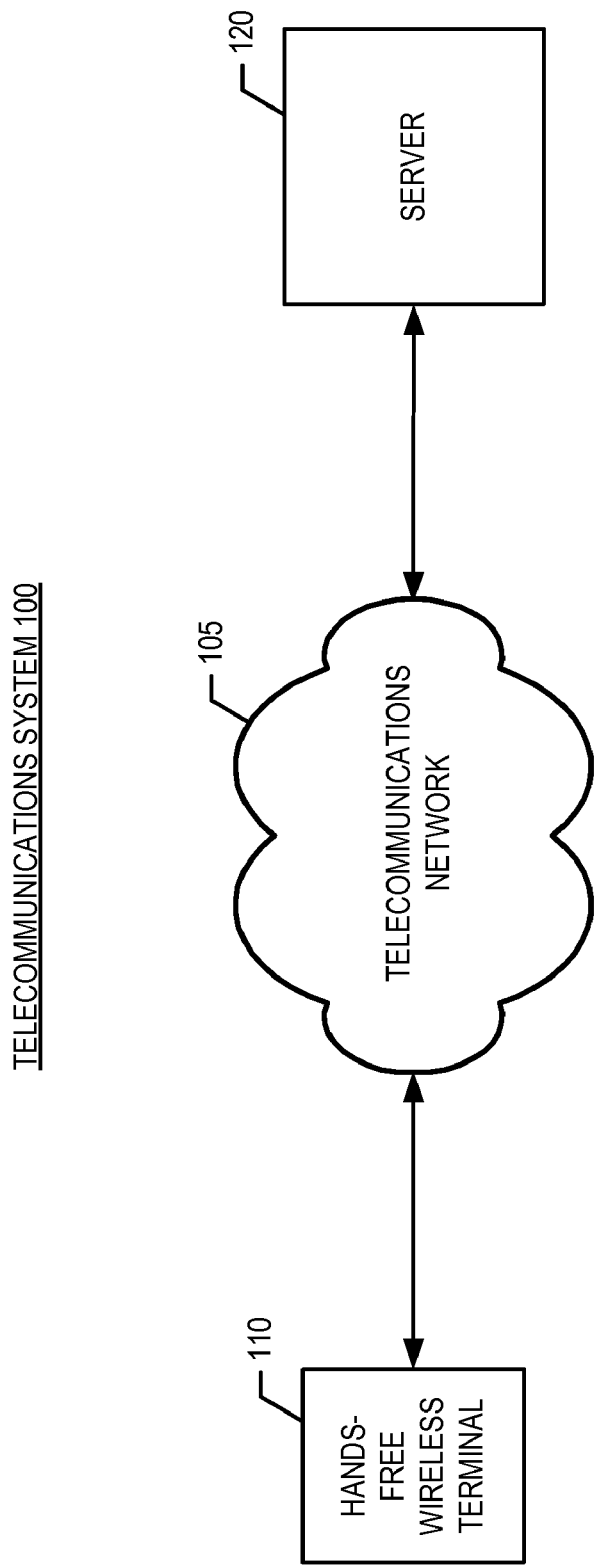
FIG. 1 depicts the salient elements of illustrative telecommunications system 100 in accordance with the prior art.
Figure 2:
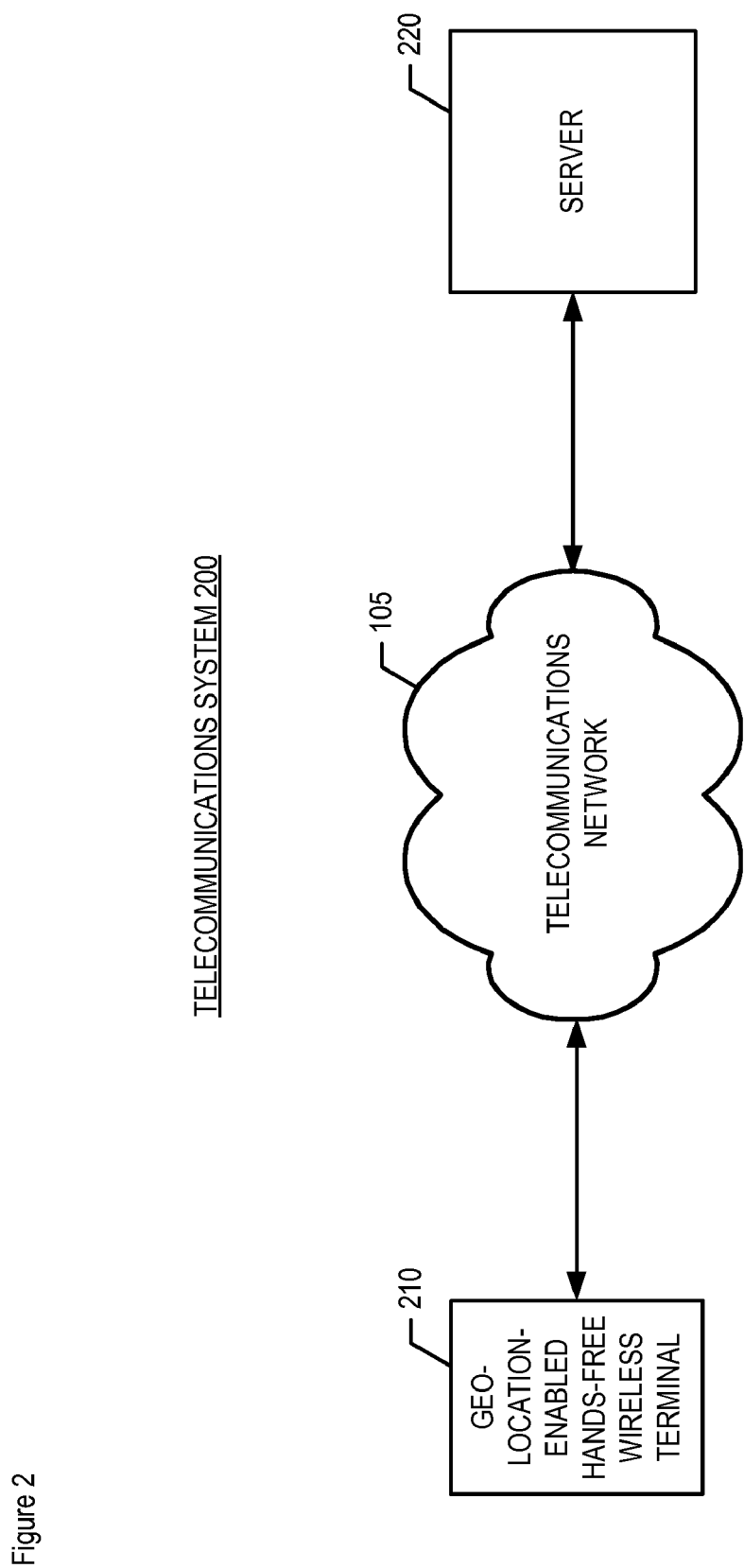
FIG. 2 depicts the salient elements of telecommunications system 200 in accordance with the illustrative embodiment of the present invention.

FIG. 2 depicts the salient elements of telecommunications system 200 in accordance with the illustrative embodiment of the present invention. As shown in FIG. 2, telecommunications system 100 comprises telecommunications network 105, geo-location-enabled hands-free wireless terminal 210, and server 220, interconnected as shown.

Figure 4:
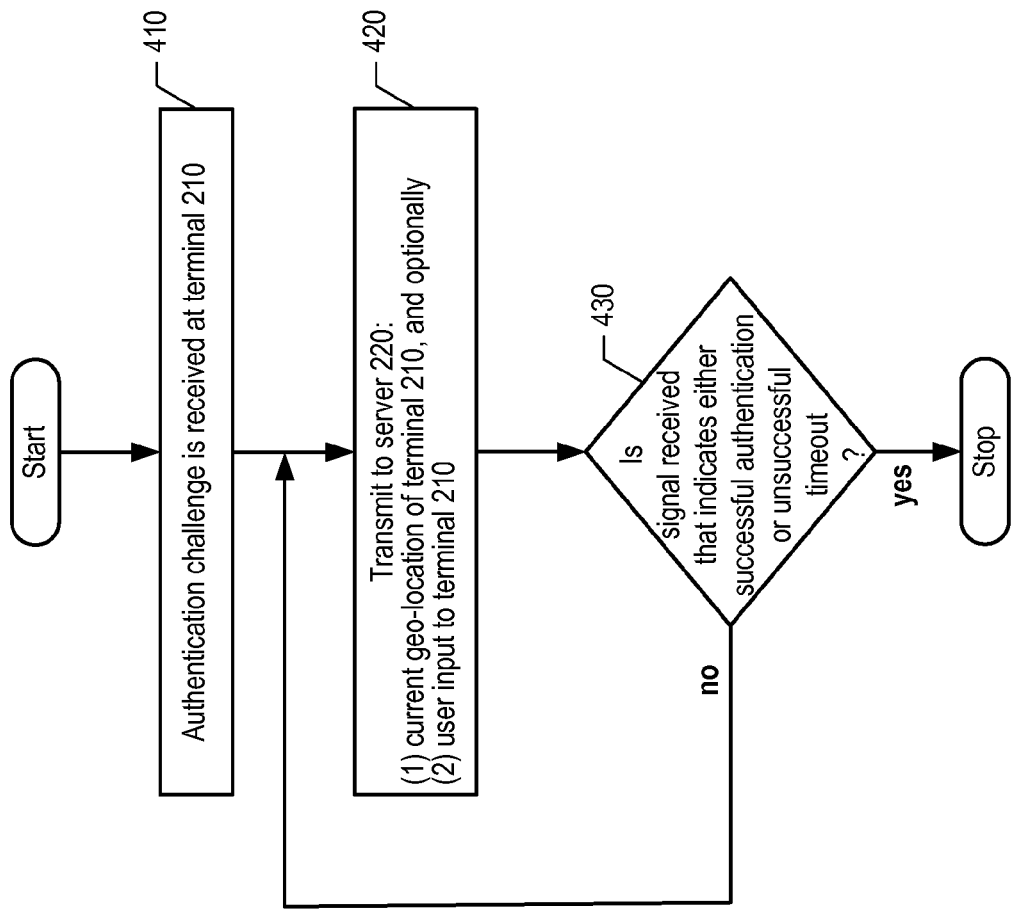
FIG. 4 depicts a flowchart of the salient tasks of hands-free wireless terminal 210, in accordance with the illustrative embodiment of the present invention.

Geo-location-enabled hands-free wireless terminal 210 is a device that is typically worn on a user's person (e.g., clipped to one of the user's ears, etc.) and is capable of:
  wirelessly transmitting and receiving electromagnetic signals to and from telecommunications network 105 via a wireless transceiver;
  receiving voice inputs from a user and converting the input to electromagnetic signals via a microphone;
  converting electromagnetic signals to acoustic signals and outputting the acoustic signals to the user via a speaker;
  receiving one or more electromagnetic signals and estimating terminal 210's geo-location based on these signals; and
  performing the tasks described below and with respect to FIG. 4 via a processor.

As will be appreciated by those skilled in the art, there are a variety of well-known methods for estimating geo-location based on received electromagnetic signals (e.g., via a Global Positioning System (GPS) receiver, via triangulation, via RF fingerprinting, etc.), and it will be clear to those skilled in the art, after reading this specification, how to make and use embodiments of the present invention for terminals that use these methods—as well as embodiments in which the estimation of terminal 210's geo-location is performed by an entity other than wireless terminal 210. As will further be appreciated by those skilled in the art, hands-free wireless terminal 210 might communicate via one or more protocols (e.g., Code Division Multiple Access [CDMA], Institute of Electrical and Electronics Engineers [IEEE] 802.11, Bluetooth, etc.), and it will be clear to those skilled in the art, after reading this specification, how to make and use embodiments of the present invention based on these protocols.

Server 220 is a data-processing system that is capable of executing one or more software applications, of receiving and transmitting signals via telecommunications network 105, and of performing the tasks described below and with respect to FIGS. 5 and 6.

Figure 3:
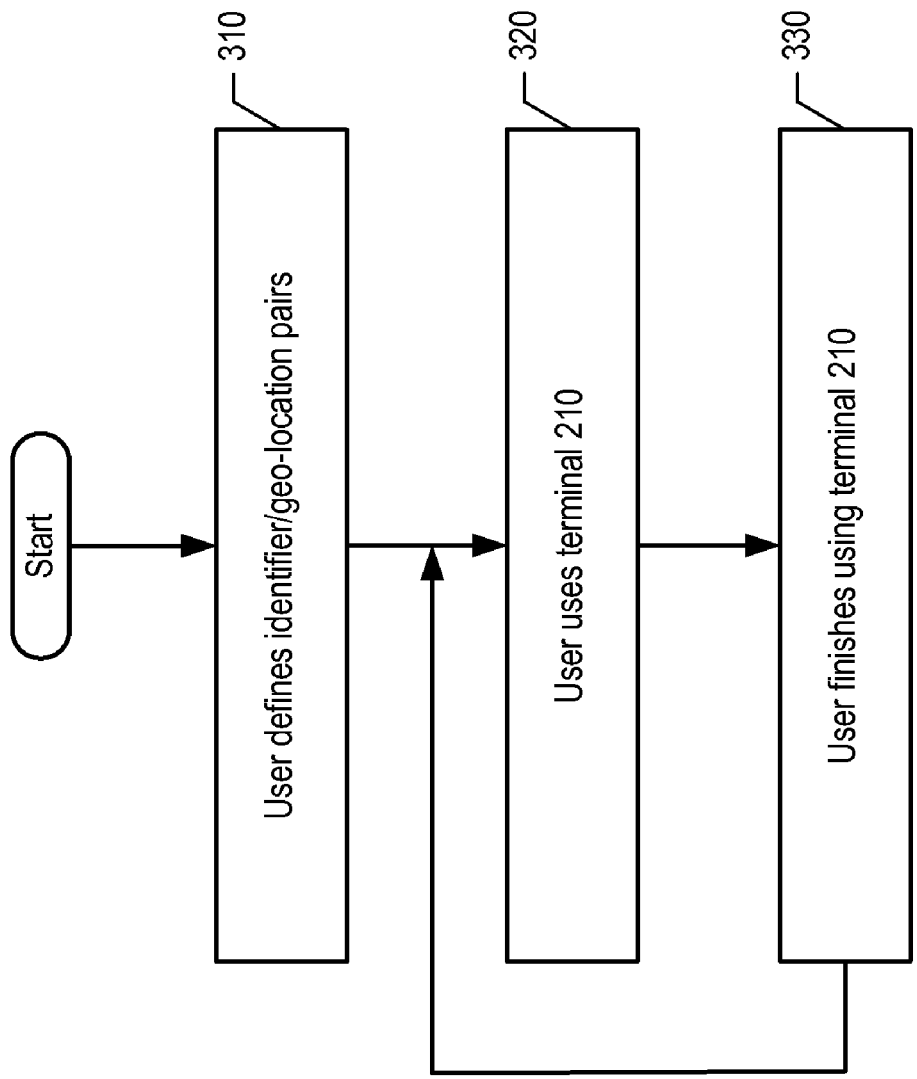
FIG. 3 depicts a flowchart of the salient tasks for a user of hands-free wireless terminal 210, as shown in FIG. 2, in accordance with the illustrative embodiment of the present invention.

FIG. 3 depicts a flowchart of the salient tasks for a user of hands-free wireless terminal 210, in accordance with the illustrative embodiment of the present invention.

At task 310, the user defines a set of identifier/geo-location pairs, prior to using geo-location-enabled hands-free wireless terminal 210. As discussed above, it is advantageous for the user to define a relatively large number of such pairs, and to choose identifiers that are meaningful to the user but that do not indicate the associated geo-locations to other people. As will be appreciated by those skilled in the art, task 310 might be performed by the user in a variety of ways, such as via a browser-based application that incorporates clickable maps, or via the user visiting various geo-locations while wearing wireless terminal 210 and saying the appropriate identifier at each geo-location. In the latter method, a preliminary "initialization" phase for wireless terminal 210 might be defined that bypasses the geo-location-based authentication process, thereby getting around the "chicken and egg" problem.

At task 320, the user uses geo-location-enabled hands-free wireless terminal 210, and is authenticated as necessary, as described below and with respect to FIGS. 4 through 6. As will be appreciated by those skilled in the art, in some embodiments only a subset of operations that the user attempts to perform with terminal 210 might require authentication (e.g., attempts to access a resource of server 220, etc.), while in some other embodiments authentication might be required for any kind of use of terminal 210.

At task 330, the user finishes using geo-location-enabled hands-free wireless terminal 210. As will be appreciated by those skilled in the art, in some embodiments of the present invention the user might proactively log out, while some other embodiments might automatically log out the user when the terminal is inactive for a given time interval, while still other embodiments might employ both of these methods.

After task 330, execution proceeds back to task 320 when the user begins using terminal 210 again.

FIG. 4 depicts a flowchart of the salient tasks of hands-free wireless terminal 210, in accordance with the illustrative embodiment of the present invention. It will be clear to those skilled in the art which tasks depicted in FIG. 4 can be performed simultaneously or in a different order than that depicted.

At task 410, an authentication challenge is received at hands-free wireless terminal 210, in response to the user of terminal 210 attempting to perform a particular operation with terminal 210.

At task 420, wireless terminal 210 transmits its current geo-location to server 220 via telecommunications network 105, in well-known fashion. In addition, if the authentication challenge is of a type that instructs the user to do something at a particular geo-location, wireless terminal 210 also transmits any user input to server 220.

Task 430 checks whether wireless terminal 210 has received a signal that indicates either (1) that the user has been successfully authenticated, or (2) that a timeout interval has expired and the user has not been authenticated. If either type of signal is received, the method of FIG. 4 terminates, otherwise execution continues back at task 420.

Figure 5:
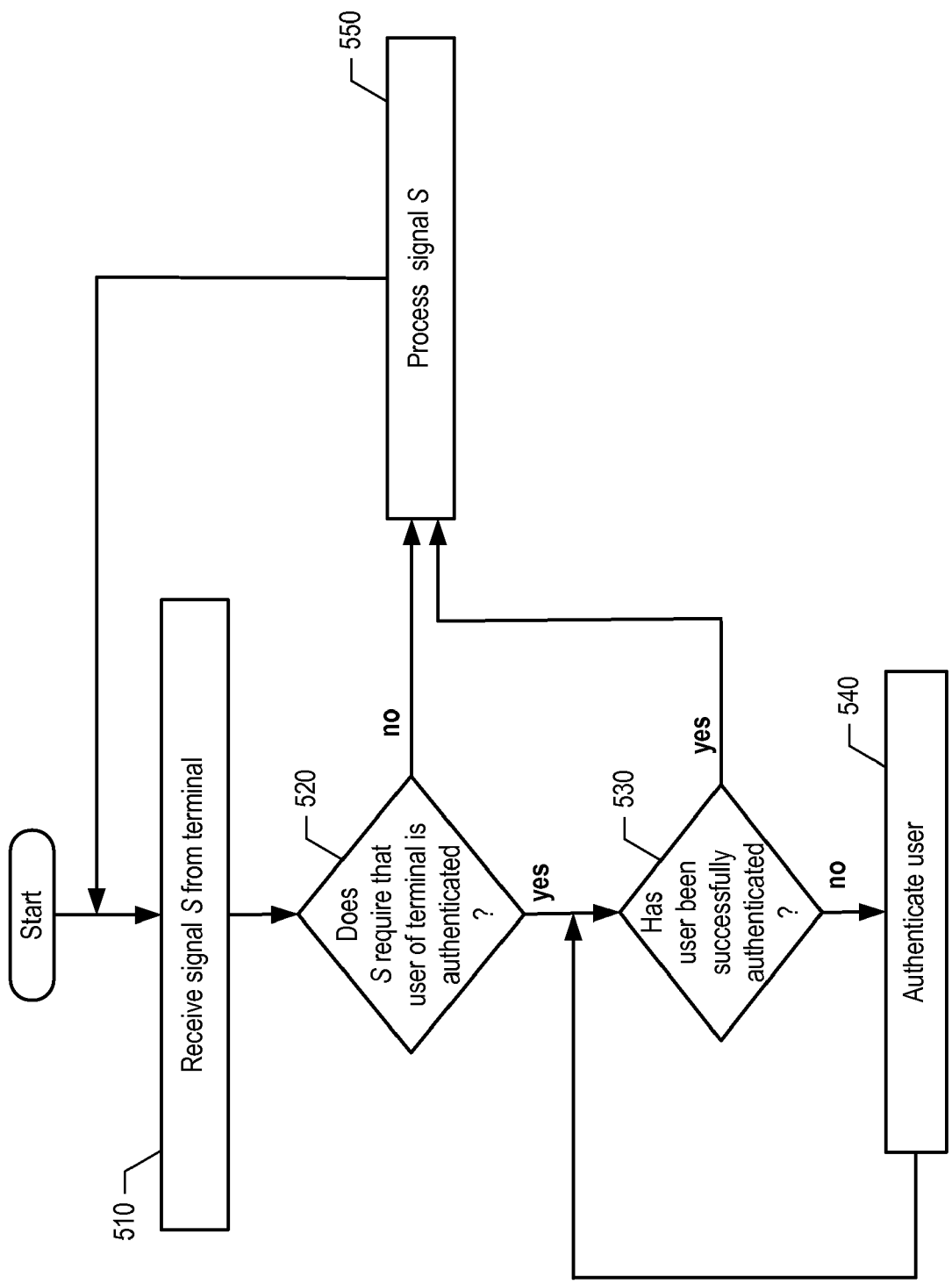
FIG. 5 depicts a flowchart of the salient tasks of server 220, as shown in FIG. 2, in accordance with the illustrative embodiment of the present invention.

FIG. 5 depicts a flowchart of the salient tasks of server 220, in accordance with the illustrative embodiment of the present invention. It will be clear to those skilled in the art which tasks depicted in FIG. 5 can be performed simultaneously or in a different order than that depicted.

At task 510, server 220 receives a signal S from wireless terminal 210, in well-known fashion.

At task 520, server 220 checks whether signal S requires that the user of wireless terminal 210 has been authenticated. If so, execution proceeds to task 530, otherwise execution continues at task 550. (As described above, in some embodiments only a subset of signals received from terminal 210 might require the user to be authenticated, while in some other embodiments authentication might be required for any signal received from terminal 210.)

At task 530, server 220 checks whether the user of wireless terminal 210 has been successfully authenticated. If so, execution continues at task 550, otherwise execution proceeds to task 540.

At task 540, server 220 authenticates the user, as described below and with respect to FIG. 6. After task 540, execution continues back at task 530.

At task 550, server 220 processes signal S in accordance with how it is programmed, in well-known fashion. After task 550, execution continues back at task 510.

Figure 6:
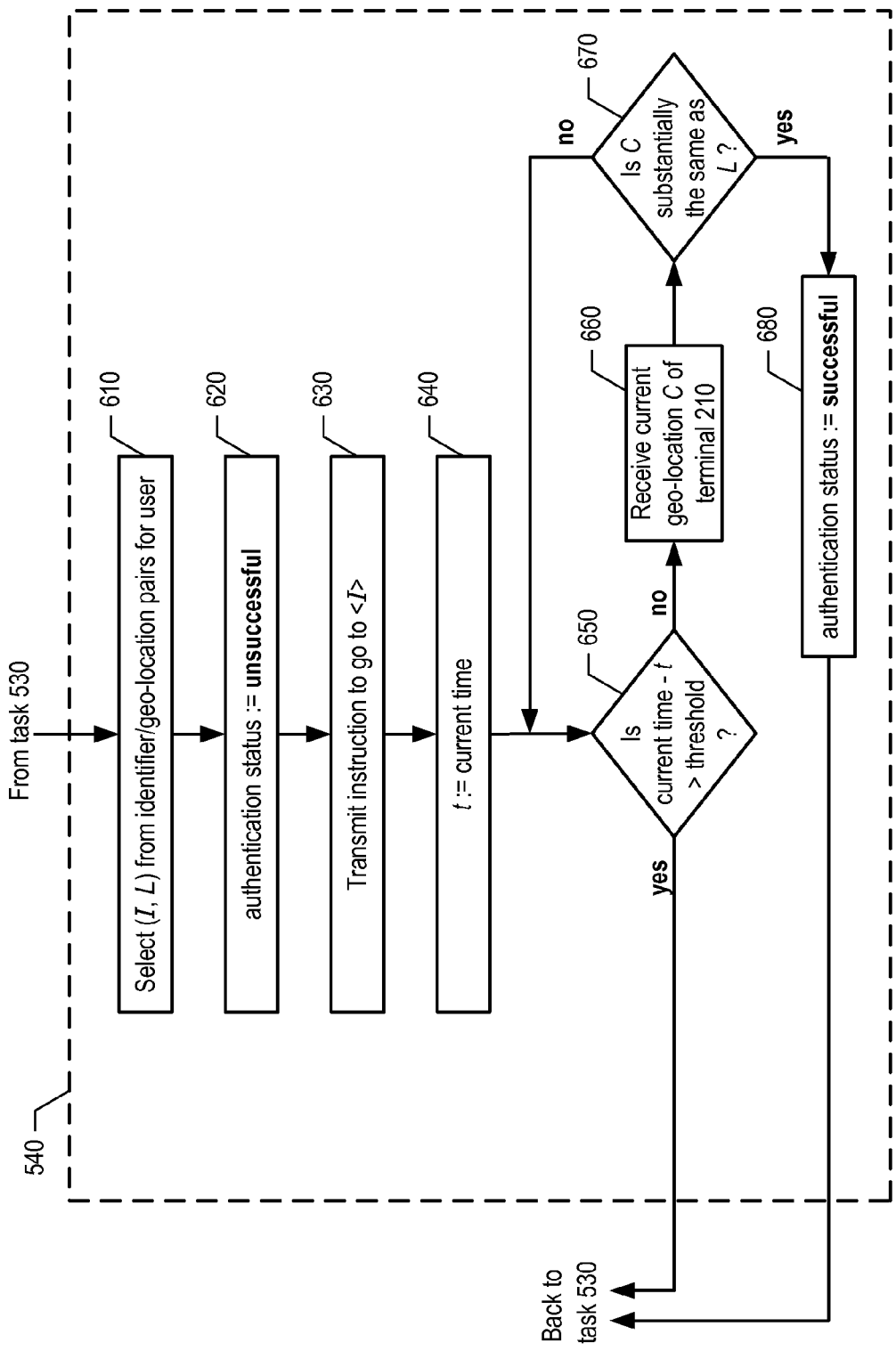
FIG. 6 depicts a detailed flowchart for task 540, as shown in FIG. 4, in accordance with the illustrative embodiment of the present invention.

FIG. 6 depicts a detailed flowchart for task 540, in accordance with the illustrative embodiment of the present invention. It will be clear to those skilled in the art which subtasks depicted in FIG. 6 can be performed simultaneously or in a different order than that depicted.

At subtask 610, server 220 selects an identifier/geo-location pair (I, L) from the list of such pairs that were defined by the user of wireless terminal 210. As will be appreciated by those skilled in the art, in some embodiments pair (I, L) might be selected randomly, while in some other embodiments pair (I, L) might be selected in sequential fashion, while still other embodiments might select pair (I, L) via some other method.

At subtask 620, server 220 sets an authentication status flag for terminal 210's user to unsuccessful.

At subtask 630, server 220 transmits to wireless terminal 210 a signal that instructs the terminal to output the phrase "go to <I>" via the terminal's speaker. As mentioned above, in some embodiments server 220 might transmit a signal that instructs the terminal's user to perform some action at geo-location <I> (e.g., "say 'hello' at <I>," "check your email at <I>," etc.)

At subtask 640, server 220 sets the value of variable t to the current time, in well-known fashion.

At subtask 650, server 220 checks whether the difference between the current time and t exceeds a pre-determined threshold. As will be appreciated by those skilled in the art, the threshold acts as a timeout, and thus the value of the threshold should be selected so that the user has sufficient time to travel to geo-location <I>. If the difference exceeds the threshold, then execution continues back at task 530 of FIG. 5 (where the value of the authentication status flag will indicate whether the user was successfully authenticated); otherwise execution proceeds to task 660.

At subtask 660, server 220 receives the current geo-location C of wireless terminal 210, in well-known fashion.

At subtask 670, server 220 checks whether geo-location C is substantially the same as geo-location L, where "substantially the same" is intended to account for inconsequentially small differences between C and L (e.g., different tables in a Starbucks, etc.) If so, execution proceeds to task 680, otherwise execution continues back at task 650.

At subtask 680, server 220 sets the authentication status flag for terminal 210's user to successful. After task 680, execution continues back at task 530 of FIG. 5.

As will be appreciated by those skilled in the art, although in the illustrative embodiment a user is authenticated by visiting one particular geo-location, in some other embodiments a user might be instructed to visit two or more geo-locations sequentially, and it will be clear to those skilled in the art, after reading this specification, how to make and use such embodiments.

Similarly, although in the illustrative embodiment server 220 handles authentication and might also host one or more software applications, some other embodiments might employ separate servers for these two functions, and it will be clear to those skilled in the art, after reading this specification, how to make and use such embodiments.

Furthermore, although the illustrative embodiment is particularly well-suited to hands-free wireless terminals, it will be clear to those skilled in the art that the basic concepts of the present invention can also be applied to wireless terminals that are not hands-free, and it will be clear to those skilled in the art, after reading this specification, how to make and use embodiments of the present invention for such terminals.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving one or more identifier/geo-location pairs that are defined by a user U, wherein each of the identifiers is meaningful to said user U but does not indicate the associated geo-location to other users, and wherein said user U is associated with a wireless telecommunications terminal;
   receiving, after the receiving of said one or more identifier/geo-location pairs, a first signal that indicates that the current user of said wireless telecommunications terminal is to be authenticated;
   selecting, in response to said first signal, an identifier/geo-location pair I/L from said one or more identifier/geo-location pairs;
   presenting identifier I at said wireless telecommunications terminal at time t; and
   when the geo-location of said wireless telecommunications terminal is substantially the same as L at a time that exceeds t by no more than a positive threshold, storing in a memory a value that indicates that the current user of said wireless telecommunications terminal is authenticated for access to a telecommunications network.

2. The method of claim 1 wherein said user U defines said identifier/geo-location pair I/L by inputting identifier I to said wireless telecommunications terminal when said wireless telecommunications terminal is at geo-location L.

3. The method of claim 1 further comprising, when and only when the geo-location of said wireless telecommunications terminal is substantially the same as L at a time that exceeds t by no more than said positive threshold, transmitting to said wireless telecommunications terminal a second signal that indicates that the current user of said wireless telecommunications terminal is authenticated for access to a telecommunications network.

4. The method of claim 1 further comprising receiving an estimate of the geo-location of said wireless telecommunications terminal at one or more points in time.

5. A method comprising:
receiving one or more identifier/geo-location pairs that are defined by a user U, wherein each of the identifiers is meaningful to said user U but does not indicate the associated geo-location to other users, and wherein said user U is associated with a wireless telecommunications terminal;
receiving, after the receiving of said one or more identifier/geo-location pairs, a first signal that indicates that the current user of said wireless telecommunications terminal is to be authenticated;
selecting, in response to said first signal, an identifier/geo-location pair I/L from said one or more identifier/geo-location pairs;
presenting at said wireless telecommunications terminal at time t identifier I and a task that involves said wireless telecommunications terminal; and
when and only when, the current user of said wireless telecommunications terminal performs said task at a geo-location that is substantially the same as L and at a time that exceeds t by no more than a positive threshold, storing in a memory a value that indicates that the current user of said wireless telecommunications is authenticated for access to a telecommunications network.

6. The method of claim 5 further comprising, when and only when the geo-location of said wireless telecommunications terminal is substantially the same as L at a time that exceeds t by no more than said positive threshold, transmitting to said wireless telecommunications terminal a second signal that indicates that the current user of said wireless telecommunications terminal is authenticated for access to a telecommunications network.

7. The method of claim 5 further comprising generating said task at random.

8. The method of claim 5 wherein said task comprises supplying an input to said wireless telecommunications terminal that is public.

9. The method of claim 5 wherein said user U defines said identifier/geo-location pair I/L by inputting identifier I to said wireless telecommunications terminal when said wireless telecommunications terminal is at geo-location L.

10. A method comprising:
receiving one or more identifier/geo-location pairs that are defined by a user U, wherein each of the identifiers is meaningful to said user U but does not indicate the associated geo-location to other users, and wherein said user U is associated with a wireless telecommunications terminal;
receiving, after the receiving of said one or more identifier/geo-location pairs, a first signal that indicates that the current user of said wireless telecommunications terminal is to be authenticated;
generating, in response to said first signal, an authentication challenge based on one of the identifier/geo-location pairs I/L;
presenting said authentication challenge at said wireless telecommunications terminal at time t; and
when and only when, the geo-location of said wireless telecommunications terminal is substantially the same as said geo-location L at a time that exceeds t by no more than a positive threshold $\Delta$, storing in a memory a value that indicates that the current user of said wireless telecommunications terminal is authenticated for access to a telecommunications network.

11. The method of claim 10 further comprising, when and only when the geo-location of said wireless telecommunications terminal is substantially the same as L at a time that exceeds t by no more than said positive threshold $\Delta$, transmitting to said wireless telecommunications terminal a second signal that indicates that the current user of said wireless telecommunications terminal is authenticated for access to a telecommunications network.

12. The method of claim 11 further comprising, when and only when said second signal is not received at said wireless telecommunications terminal in time interval $[t, t+\Delta]$, generating a third signal after time $t+\Delta$ that indicates that the current user of said wireless telecommunications terminal is not authenticated for access to a telecommunications network.

13. The method of claim 10 wherein said user U defines said identifier/geo-location pair I/L by inputting identifier I to said wireless telecommunications terminal when said wireless telecommunications terminal is at geo-location L.

14. The method of claim 10 further comprising transmitting from said wireless telecommunications terminal an estimate of the geo-location of said wireless telecommunications terminal at one or more points in time.

15. A method comprising:
receiving one or more identifier/geo-location pairs that are defined by a user U, wherein each of the identifiers is meaningful to said user U but does not indicate the associated geo-location to other users, and wherein said user U is associated with a wireless telecommunications terminal;
receiving, after the receiving of said one or more identifier/geo-location pairs, a first signal that indicates that the current user of said wireless telecommunications terminal is to be authenticated;
generating, in response to said first signal, an authentication challenge that is based on one of the identifier/geo-location pairs I/L and comprises a task that involves said wireless telecommunications terminal;
presenting said authentication challenge at said wireless telecommunications terminal at time t; and
when, and only when, the current user of said wireless telecommunications terminal performs said task at a geo-location that is substantially the same as L and at a time that exceeds t by no more than a positive threshold $\Delta$, storing in a memory a value that indicates that the current user of said wireless telecommunication terminal is authenticated for access to a telecommunications network.

16. The method of claim 15 further comprising, when and only when the geo-location of said wireless telecommunications terminal is substantially the same as L at a time that exceeds t by no more than said positive threshold Δ, transmitting to said wireless telecommunications terminal a second signal that indicates that the current user of said wireless telecommunications terminal is authenticated for access to a telecommunications network.

17. The method of claim 15 wherein said task comprises supplying an input to said wireless telecommunications terminal that is public.

18. The method of claim 16 further comprising, when and only when said second signal is not received at said wireless telecommunications terminal in time interval [t, t+Δ], generating a third signal after time t+Δ that indicates that the current user of said wireless telecommunications terminal is not authenticated for access to a telecommunications network.

19. The method of claim 15 wherein said user U defines said identifier/geo-location pair I/L by inputting identifier I to said wireless telecommunications terminal when said wireless telecommunications terminal is at geo-location L.

* * * * *